United States Patent Office 3,454,677
Patented July 8, 1969

3,454,677
INNER SALTS OF AMINOPHOSPHONATES AND PREPARATION THEREOF
Robert D. Burpitt, Kingsport, Tenn., assignor to Eastman Kodak Company, Rochester, N.Y., a corporation of New Jersey
No Drawing. Filed Mar. 7, 1966, Ser. No. 532,062
Int. Cl. C07f 9/38; C08g 51/60
U.S. Cl. 260—924    6 Claims

ABSTRACT OF THE DISCLOSURE

Inner salts of aminophosphonates, useful as stabilizers for organic esters such as dimethyl terephthalate, are prepared by heating aminophosphonates.

---

This invention relates to new inner salts of aminophosphates which are especially useful as color stabilizers in the storage of organic esters. This invention also relates to a novel method of preparing these new inner salts. In particular, the invention is directed to a process for conversion of dimethyl 1-(dialkylamino) alkylphosphonates to the corresponding inner salts.

The starting aminophosphonates are themselves well known. The starting materials may readily be prepared by one of several known methods. E. K. Fields [in J. Am. Chem. Soc., 74, 1528–1531 (1952)] reported the preparation of aminophosphonates by allowing a phosphite ester to react with a preformed imine. Also G. Opitz et al. [Ann. 665, 91–101 (1963)] reported a preparation of the present starting materials by reacting a phosphite ester with a preformed enamine. In addition, several reactions of these aminophosphonates have recently been reported. For example, B. H. Alexander et al., [J. Org. Chem., 28, 3499–3501 (1963)] reported a novel conversion of a phosphonate to a phosphate. H. Zimmer and J. P. Bercz reported at the 146th National Meeting of the American Chemical Society (paper No. 53, p. 28c of the abstracts of the Division of Organic Chemistry) that enamines and amidines may be prepared from alpha-aminophosphono carbanions. Although the starting aminophosphonates themselves (as well as several reactions thereof) are known, no conversion of dimethyl 1-(dialkylamino) alkylphosphonates to the corresponding inner salts has been reported.

Thus, it is an object of this invention to provide a novel process for conversion of dimethyl 1-(dialkylamino) alkylphosphonates to the corresponding inner salts. Another object is to provide as new compositions of matter the inner salts of these dimethyl 1-(dialkylamino) alkylphosphonates.

The inner salts of aminophosphonates are formed according to the following general reaction:

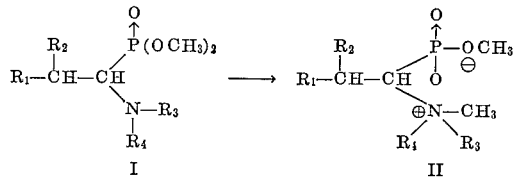

Structure II represents the general formula of the inner salts involved in this invention; and $R_1$ and $R_2$ represent alkyl radicals, including substituted and unsubstituted alkyl radicals, containing from 1 to 8 carbon atoms, monocyclic aromatic radicals of the benzene series including substituted and unsubstituted phenylene, or when taken with the atom to which they are attached may form a 5 or 6 membered ring. $R_3$ represents hydrogen, an alkyl radical, including substituted and unsubstituted alkyl radicals, containing from 1 to 8 carbon atoms (preferably lower alkyl), or a monocyclic aromatic radical of the benzene series, including substituted and unsubstituted phenylene. $R_4$ represents an alkyl radical, including substituted and unsubstituted radicals, containing from 1 to 8 carbon atoms (preferably lower alkyl), or a monocyclic aromatic radical of the benzene series, including substituted and unsubstituted phenylene.

In general the formation of these inner salts is accomplished by heating the appropriate aminophosphonate and purifying the product by crystallization. The temperature is not critical and about 50–250° C. is suitable.

The following examples will serve to illustrate representative aminophosphonate inner salts of my invention, as well as the methods for preparing these inner salts. In the examples that follow, the melting points and boiling points are uncorrected. The melting points were determined on a Fischer-Johns melting point block. The nuclear magnetic resonance (NMR) spectra were measured at 60 mc. on a Varian Associate model A-60 spectrometer. Chemical shifts are given in p.p.m. relative to internal tetramethylsilane. The infrared spectra were determined on Baird AB-2 and MK-1A spectrophotometers and major absorption bands are reported in microns ($\mu$). All structural assignments are based on analyses and NMR spectra.

EXAMPLE 1

The following reaction is illustrative of the method of Opitz for preparing the starting aminophosphonate:

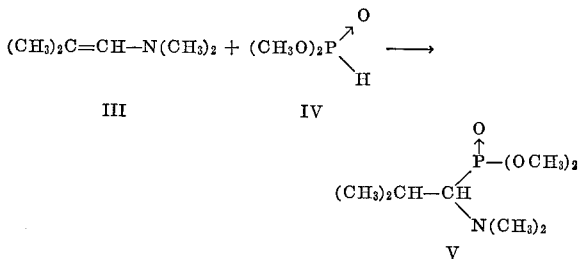

A 55 gm. portion (0.55 mole) of N,N-dimethylisobutenylamine (III) was slowly added to 50 gm. (0.45 mole) portion of dimethylhydrogenphosphite (IV). The addition was carried out with cooling in order to maintain the temperature below 60° C. After addition, the resulting mixture was allowed to stand until it cooled to room temperature and was then distilled to give 81 gm. (78%) of dimethyl 1-dimethylamino-2-methylpropylphosphonate (V) with a boiling point of 64–66° C. (ca. 0.3–0.4 mm.) and an index of refraction ($n_D^{20}$) of 1.4452. The theoretical value calculated for $C_8H_{20}NO_3P$ was N, 6.7 and the amount actually found was N, 6.6. The neat infrared and NMR spectra revealed the structure assigned to V above.

Next the crude reaction mixture obtained above was heated at atmospheric pressure with 0.1 gm. of p-toluenesulfonic acid. The temperature of the refluxing mixture rose from 160–170° C. during the one hour relux period. No weight loss was incurred in the reaction mixture. The resulting viscous mixture crystallized, on standing, to a white solid. The solid, on trituration with acetone, gave 85 gm. (41%) of trimethyl [2 - methyl-1 - (methyl - phosphono)propyl] ammonium hydroxide, inner salt (VI, below). The general reaction may be illustrated as follows:

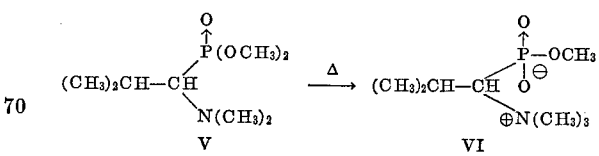

A sample recrystallized from acetonitrile melted at 233–235° C. with recomposition. The material proved to be very hygroscopic and consistent elemental analyses were not obtained.

The theoretical values calculated for $C_8H_{20}NO_3P$ and the values actually found were as follows. Theoretical: C, 45.9; H, 9.6; N, 6.7; P, 14.8; mol. wt. 209. Found: C, 44.1; H, 10.1; N, 7.1; P, 13.3; mol. wt. 202.

The major infrared absorption bands (KBr) were 8.0–8.2, 9.19, 9.5, 11.29 and 13.1. The NMR ($D_2O$) spectra gave the following: a doublet with an area equivalent to 3 protons and a spacing of 11 c.p.s. at 3.47 (methoxy group), a single peak with an area equivalent to 9 protons at 3.13 (methyl groups on quaternized nitrogen), the peaks due to the tertiary proton were overlapped by one of the methoxy peaks and the N-methyl peak, and a broad peak at 2.4 and two doublets at 1.17 (isopropyl group).

EXAMPLE 2

Example 1 was repeated without the addition of the acid catalyst. The same inner salt (VI) was obtained in essentially the same yield.

EXAMPLE 3

Dimethyl 2 - dimethylamino - 2 - methylpropylphosphonate (V) was prepared according to the method of Fields by allowing isobutyraldehyde to react with a mixture of dimethylamine and dimethylhydrogenphosphite. The distilled phosphonate on being heated (no acid catalyst) gave the same inner salt (VI) as Example 1 in essentially the same yield.

EXAMPLE 4

In an attempt to prepare dimethyl 1-butylamino-2-methylpropylphosphonate by allowing isobutyraldehyde to react with a mixture of dimethyl hydrogen phosphite and n-butylamine, there was obtained instead the inner salt of butyl [2 - methyl - 1 - (methylphosphono) - propyl] ammonium hydroxide (IX) below. This inner salt may have arisen from partial hydrolysis of the intermediate aminophosphonate under the conditions of its formation. The reaction may be illustrated as follows:

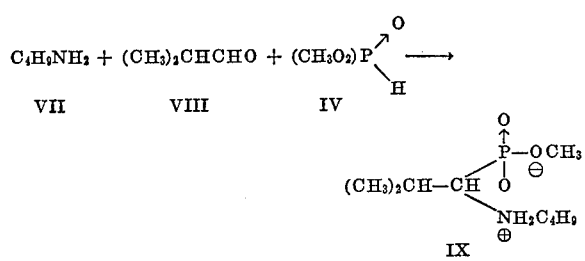

A 36 gm. (0.5 mole) portion of isobutyraldehyde (VIII) was added to a mixture of 55 gm. (0.5 mole) of dimethylhydrogenphosphite (IV) and 36 gm. (0.5 mole) of butylamine (VII). The temperature of the mixture rose to 120° (refluxing) during the addition. Sodium sulfate was added to the mixture after it had cooled to room temperature. After standing for 72 hrs. the desiccant was removed by filtration and the filtrate distilled to a base temperature of 130° (2mm.). The residue crystallized to a gummy solid on cooling. This solid on trituration with cold acetone gave 28 gm. (25%) of the inner salt of butyl [2-methyl - 1 - (methylphosphono)-propyl] ammonium hydroxide (IX), M.P. 181–185° C.

The calculated theoretical values for $C_9H_{22}NO_3P$ and the actual values found were as follows. Theoretical: C, 48.4; H, 9.9; N, 6.3; P, 13.9; mol. wt. 223. Found: C, 48.4; H, 10.0; N, 6.4; P, 13.6; mol. wt. 231.

The major infrared absorption bands (KBr) were 8.2 (wide), 9.2–9.5, 13.2 and 14.15. The NMR spectra revealed the following: doublet at 3.69 with an area equivalent to 3 protons with a spacing of 11 c.p.s. (methoxy group), peaks centered at 3.23 (methylene protons next to nitrogen and the tertiary proton), a peak at 2.34 (tertiary proton of the isopropyl group), a broad peak at 1.58 (methylene protons of the butyl group), and 2 doublets with an overlapping triplet centered at 1.07 (methyl groups).

EXAMPLE 5

Dimethyl 1 - (butylamino)-2-methylpropylphosphonate (XI), below was prepared in a 71% yield according to the method of Fields. The boiling point was 96–98° (ca. 0.25 mm.) and an $n_D^{20}$ of 1.4418. The residue from the distillation of the above aminophosphonate gave 2 g. of solid which was identical to the inner salt IX prepared in Example 4.

Next the dimethyl 1 - (butylamino) - 2 - methylpropylphosphonate (20 g., 0.08 mole) was heated to 190° over a half-hour period. A viscous oil resulted which did not give a solid on treatment with various solvents. This oil appeared by NMR to be the impure inner salt of butylmethyl [2 - methyl - 1 - (methylphosphono)propyl] ammonium hydroxide (XII, below). The reaction proceeded as follows:

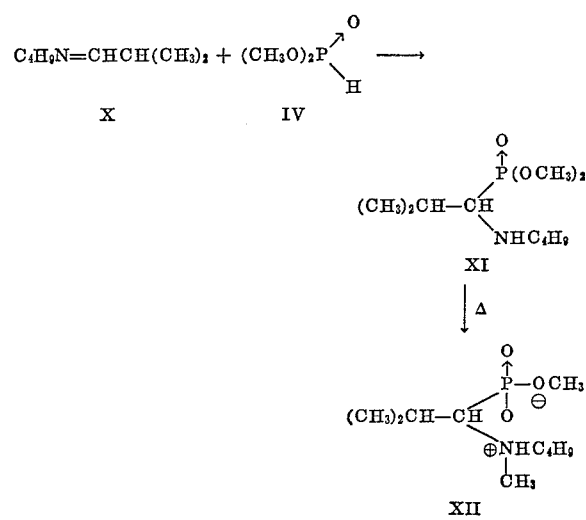

The NMR spectra ($D_2O$) revealed the following: a doublet at 3.65 with a spacing of 11.0 c.p.s. and an area equivalent to three protons ($-OCH_2$), a single sharp peak at 3.19 ($\equiv \overset{\oplus}{N}-CH_2-$) which overlapped peaks for the $-CH_2-\overset{\oplus}{N}-CH-$, with total area equivalent to 6 protons, a broad band from 1.2–2.2 (tertiary proton of the isopropyl group, methylene protons of the butyl group) and 3 peaks centered at 1.08 (methyl groups).

EXAMPLE 6

According to the method of Fields, dimethyl 1-methylamino - 2 - methylpropylphosphonate (XIII, below) was prepared. The compound had a boiling point of 64° C. (at 0.3 mm.) and an index of refraction ($n_D^{20}$) of 1.4473. Upon heating the compound the following reaction occurred to yield the corresponding inner salt (XIV) as an impure, viscous oil:

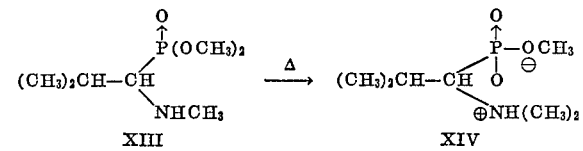

The compounds which are a subject of this invention are especially useful for stabilizing organic esters such as dimethyl terephthalate (DMT) and for this purpose amounts of the order of about 0.001% to 5.0% can be admixed with the ester by a suitable means. In the case of use of these phosphoros compounds for stabilizing DMT, the compounds can be expected to stabilize the polyesters such as polyethylene terephthalate prepared therefrom.

Although this invention has been described in considerable detail with particular reference to certain preferred embodiments thereof, it will be readily understood that variations and modifications can be effected within the spirit and scope of the invention as described hereinabove.

I claim:

1. An inner salt of dimethyl 1-(dialkylamino)alkylphosphonate of the general formula:

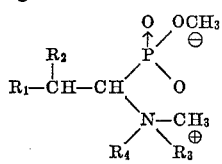

wherein $R_1$ and $R_2$ are chosen from the group consisting of alkyl radicals containing from 1 to 8 carbon atoms; and $R_3$ is chosen from the group consisting of hydrogen, an alkyl radical containing from 1 to 8 carbon atoms.

2. An aminophosphonate inner salt according to claim 1 of the formula:

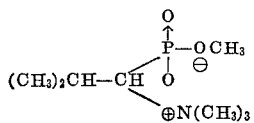

3. An aminophosphonate inner salt according to claim 1 of the formula:

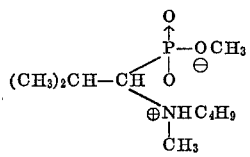

4. An aminophosphonate inner salt according to claim 1 of the formula:

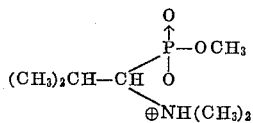

5. An aminophosphonate inner salt according to claim 1 of the formula:

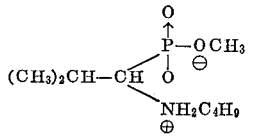

6. A process for forming an inner salt from a compound having the general formula:

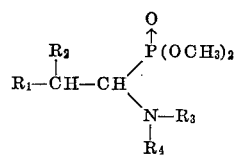

wherein $R_1$ and $R_2$ are chosen from the group consisting of alkyl radicals containing from 1 to 8 carbon atoms; $R_3$ is chosen from the group consisting of hydrogen, an alkyl radical containing from 1 to 8 carbon atoms; and $R_4$ is an alkyl radical containing from 1 to 8 carbon atoms, comprising the steps of heating said compound to a temperature of 50–250° C. and purifying the resultant product by crystallization.

References Cited

UNITED STATES PATENTS 2,774,786  12/1956  Erickson _____ 260—987 XR
3,316,331   4/1967  Sims _____ 260—945 XR CHARLES B. PARKER, *Primary Examiner.*

A. H. SUTTO, *Assistant Examiner.*

U.S. Cl. X.R.

260—475, 945, 987